(12) United States Patent
Momosaki et al.

(10) Patent No.: US 7,874,149 B2
(45) Date of Patent: Jan. 25, 2011

(54) EXHAUST APPARATUS FOR VEHICLE, AND MOTORCYCLE HAVING THE SAME

(75) Inventors: Makoto Momosaki, Kakogawa (JP); Tomohiro Kanazawa, Osaka (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 267 days.

(21) Appl. No.: 11/504,706

(22) Filed: Aug. 16, 2006

(65) Prior Publication Data

US 2007/0039317 A1 Feb. 22, 2007

(30) Foreign Application Priority Data

Aug. 17, 2005 (JP) ............................ P2005-236542
Aug. 17, 2005 (JP) ............................ P2005-236543

(51) Int. Cl.
 *F01N 3/10* (2006.01)
(52) U.S. Cl. ................................ 60/299; 60/302; 60/323
(58) Field of Classification Search .................. 60/299, 60/323, 302, 322; 180/89.2, 296, 309; D12/110
See application file for complete search history.

(56) References Cited

U.S. PATENT DOCUMENTS

| 5,271,477 | A | * | 12/1993 | Gekka et al. ................. 180/219 |
| 5,966,932 | A | * | 10/1999 | Yahagi ......................... 60/322 |
| 6,334,306 | B1 | * | 1/2002 | Mori et al. .................... 60/297 |
| 6,933,056 | B2 | * | 8/2005 | Mathew ........................ 428/552 |
| 6,962,049 | B2 | * | 11/2005 | Ashida et al. .................. 60/323 |
| 7,162,868 | B2 | * | 1/2007 | Funakoshi ...................... 60/323 |
| 7,578,124 | B2 | * | 8/2009 | Diez et al. ...................... 60/323 |
| 2001/0027648 | A1 | * | 10/2001 | Nakayasu et al. ............. 60/324 |
| 2001/0032460 | A1 | * | 10/2001 | Hisanaga et al. .............. 60/323 |
| 2002/0162319 | A1 | * | 11/2002 | Crocker et al. ................ 60/274 |
| 2004/0170519 | A1 | * | 9/2004 | Fujii et al. ................... 420/417 |
| 2005/0039448 | A1 | * | 2/2005 | Terashima .................... 60/323 |
| 2006/0283180 | A1 | * | 12/2006 | Hiraga ......................... 60/299 |

FOREIGN PATENT DOCUMENTS

| JP | 58053621 A | * | 3/1983 |
| JP | 2-101014 | | 8/1990 |
| JP | 06-026375 | | 2/1994 |
| JP | 09-170430 | | 6/1997 |
| JP | 3022358 | | 1/2000 |
| JP | 2001-295641 | | 10/2001 |
| JP | 2002-295249 | | 10/2002 |
| JP | 2004-100598 | | 4/2004 |
| JP | 2004-301026 | | 10/2004 |

* cited by examiner

*Primary Examiner*—Tu M Nguyen
(74) *Attorney, Agent, or Firm*—Wenderoth, Lind & Ponack, L.L.P.

(57) ABSTRACT

There is provided an exhaust apparatus for a vehicle. The exhaust apparatus includes a plurality of exhaust path forming members constituting an exhaust path from an exhaust port of an engine to an inlet of an exhaust muffler and connected to each other. End portions of the exhaust path forming members, made of different materials, are included in the plurality of exhaust path forming members and are connected to each other by a flange joint.

14 Claims, 10 Drawing Sheets

EXHAUST APPARATUS FOR VEHICLE, AND MOTORCYCLE HAVING THE SAME

BACKGROUND OF THE INVENTION

1. Field of the Invention

The present invention relates to an exhaust apparatus for a vehicle and a motorcycle having the exhaust apparatus.

2. Description of the Related Art

In an exhaust apparatus for a vehicle, an exhaust path from an exhaust port of an engine to an inlet of an exhaust muffler is constituted by an exhaust path forming member such as an exhaust pipe or the like. Typically, the exhaust path is composed of a plurality of exhaust path forming members connected to each other as a matter of convenience for a layout of the exhaust apparatus, a length of the exhaust path or an installation of a catalyst apparatus.

In the case of connecting the exhaust path forming members made of the same material to each other, for example, in the case of connecting the exhaust path forming members made of stainless steel to each other, or in the case of connecting the exhaust path forming members made of titanium to each other, it is possible to join them by welding with a compact configuration and high sealing performance.

On the other hand, in the case of connecting the exhaust path forming members made of the different materials to each other, it is hard to join them by welding. Accordingly, they have been conventionally connected by a fitting joint using a clamp. In other words, in FIG. 11, end portions 301a and 302a of exhaust path forming members 301 and 302 made of the different materials are fitted to each other via a seal 305, and an outer peripheral surface of the fitted portions is fastened by an annular clamp 303. See for example, the Japanese Unexamined Utility Model Publication No. H02-101014.

Further, in the conventional exhaust apparatus for the motorcycle, there is often the case that the catalyst apparatus is installed in the exhaust muffler arranged in a rear portion of a vehicle body, as disclosed in Japanese Patent No. 3022358.

In this case, since the length of the exhaust path from the exhaust port of the engine to the catalyst apparatus becomes long, and an exhaust gas is brought into contact with the catalyst apparatus in a state in which the temperature of the exhaust gas is lowered, and activation of the catalyst apparatus is lowered.

Conversely, if the catalyst apparatus is arranged in the exhaust path forming member in the front of the engine, it is possible to make the length of the exhaust path from the exhaust port to the catalyst apparatus short. In this case, since a radiator or the like is arranged in the front of the engine, the layout space for the catalyst apparatus is limited, and a temperature of the catalyst apparatus is lowered due to a direct application of running wind on traveling or wind from the radiator.

Further, as disclosed in Japanese Unexamined Patent Publication No. H06-26375, there is an exhaust apparatus in which the catalyst apparatus is arranged under the engine. As shown in FIG. 12, an exhaust pipe 405 of the exhaust apparatus made of titanium has an expanded portion 405a under an engine 410. The catalyst apparatus 400 is made of stainless steel, and is composed of a cylindrical case 402 and a metal honeycomb 401 built the cylindrical case 402. The catalyst apparatus 400 is arranged within the expanded portion 405a, and the cylindrical case 402 is fixed to the expanded portion 405a via a bracket 411. The bracket 411 is made of titanium, and is fixed to the expanded portion 405a made of the same material by welding. In the case, the bracket 411 is coupled to the cylindrical case 402 made of the different material by caulking or bending.

3. Problems to be Solved by the Invention

Returning now to FIG. 11, it is necessary to form linear fitting portions 301a and 302a in the respective exhaust path forming members 301 and 302. However, the linear fitting portions 301a and 302a have a fixed length L1 in a length direction of an exhaust path. Accordingly, a dimension of the connecting portion (the fitting portions 301a and 302a) in the length direction of the exhaust path is increased, and a wide work space more than the length L1 is required at a connecting work (at an assembling work). Whereby, it becomes hard to execute the connecting work in the narrow space. Further, a pair of protruding pieces 307 for contracting the annular clamp 303 are formed in the annular clamp 303 so as to protrude outward in a radial direction. The protruding pieces 307 are provided with a nut 311 and a bolt 310 inserted to the protruding pieces 307. The annular clamp 303 is fastened on an outer peripheral surface of the fitting portion 302a by contracting by the bolt 310 and the nut 311. Accordingly, a wide layout space is necessary in a radial direction.

Particularly, in the case that it is necessary to arrange the exhaust path forming member compactly around the engine such as the motorcycle, it is hard to compactly arrange the exhaust apparatus by utilizing only the fitting joint using the clamp 303.

Further returning to FIG. 12, since the expanded portion 405a accommodating the catalyst apparatus 400 is made of the titanium, and the catalyst apparatus 400 is made of the stainless steel, it is impossible to join the catalyst apparatus 400 to the expanded portion 305a made of the different material by welding. Accordingly, the bracket 411 is interposed between the expanded portion 405a and the case 402, and the bracket 411 mechanically holds the case 402 by caulking or bending, and is fixed to the expanded portion 405a by welding.

If the bracket 411 as shown in FIG. 12 is provided, a number of parts for assembling the catalyst apparatus 400 is increased, and two assembling processes comprising a caulking process and a welding process are necessary when the catalyst 400 is installed in the expanded portion 405a. Further, since an extra annular space for arranging the bracket 411 is required between the expanded portion 305a and the case 402, a diameter of the expanded portion 405a is enlarged so as to sufficiently secure an exhaust gas distributing cross sectional area of the catalyst apparatus 400. In this case, particularly in the motorcycle, if the outer diameter of the expanded portion 305a arranged under the engine 410 is enlarged, a bank angle and a minimum road clearance of the motorcycle may become small.

SUMMARY OF THE INVENTION

The present invention addresses the above described condition, and one object of the present invention is to provide an exhaust apparatus in which end portions of exhaust path forming members made of different materials can be compactly connected to each other.

Another object of the present invention is to provide an exhaust apparatus having a compact and simple mounting structure of a catalyst apparatus.

In order to achieve the object mentioned above, in accordance with the first aspect of the present invention, there is provided an exhaust apparatus for a vehicle comprising: an exhaust apparatus for a vehicle comprising: a plurality of exhaust path forming members constituting an exhaust path from an exhaust port of an engine to an inlet of an exhaust muffler and connected to each other, wherein end portions of the exhaust path forming members made of different materials among the plurality of exhaust path forming members are connected to each other by a flange joint.

In accordance with the structure mentioned above, since the end portions of the exhaust pipe forming members made of the different materials are connected to each other by the flange joint, it is possible to make a connecting portion between the exhaust pipe forming members in both of a length direction of the exhaust path and a radial direction more compact in comparison with the fitting joint using the clamp so that a freedom of piping of the exhaust apparatus is increased, an entire of the exhaust apparatus can be made compact, and a space for an assembling work can be made small and an assembling work can be easily executed.

In the exhaust apparatus, preferably one of two exhaust path forming members connected by the flange joint may be a catalyst pipe accommodating a catalyst apparatus, and the other may be an exhaust pipe.

In accordance with the structure, since the catalyst pipe reaching a high temperature due to a heat generating operation of the catalyst, and the exhaust pipe are made of the different materials, the catalyst pipe is formed by a material having a high heat resistance, and the other exhaust pipe can be formed by a more inexpensive material than the catalyst pipe, whereby it is possible to achieve a reduction of cost.

In the exhaust apparatus, preferably the catalyst apparatus may be fixed to the catalyst pipe by welding.

In accordance with the structure, since any special mounting member or the like, for example, a bracket or the like are not required, the structure of the catalyst apparatus can be simplified, and an assembling work of the catalyst apparatus is easily executed. Further, even in the case that the exhaust gas distributing cross sectional area of the catalyst apparatus is enlarged, it is not necessary to enlarge the outer diameter of the catalyst pipe more than necessary.

In the exhaust apparatus, preferably, the exhaust pipe connected to the catalyst pipe may be made of a material having a smaller specific gravity than a material of the catalyst pipe.

In accordance with the structure mentioned above, it is possible to reduce weight of an entire of the exhaust apparatus.

In the exhaust apparatus, preferably the catalyst pipe is made of stainless steel, and the exhaust pipe connected to the catalyst pipe is made of titanium or titanium alloy.

In accordance with the structure, it is possible to reduce weight of the exhaust apparatus while maintaining simplification of the catalyst apparatus.

In the exhaust apparatus, preferably the catalyst pipe may be arranged under the engine and a front end of the catalyst pipe is connected to the exhaust pipe by the flange joint.

In accordance with the structure mentioned above, since the catalyst pipe is arranged under the engine, the exhaust gas discharged from the exhaust port of the engine can circulate the catalyst apparatus under a state having a comparatively high temperature, an activation of the catalyst is promoted. Further, since the front end of the catalyst pipe is connected to the exhaust pipe by the flange joint, even when the catalyst pipe is arranged under the engine, the catalyst pipe and the exhaust pipe can be easily and compactly connected.

In accordance with the structure mentioned above, it is possible to reduce weight of the exhaust apparatus while keeping a simplification of he catalyst apparatus, and it is possible to easily provide with the material.

In accordance with the present invention, there is provided a motorcycle having an exhaust apparatus for a vehicle, the exhaust apparatus comprising: a plurality of exhaust path forming members constituting an exhaust path from an exhaust port of an engine to an inlet of an exhaust muffler and connected to each other, wherein end portions of the exhaust path forming members made of different materials are connected to each other by a flange joint, and one of two exhaust path forming members connected by the flange joint is a catalyst pipe accommodating a catalyst apparatus, and the other is an exhaust pipe.

In accordance with the structure mentioned above, it is possible to make the dimensions of the connecting portions between the catalyst pipe and the exhaust pipe in the pipe length direction smaller in comparison with the fitting joint using the clamp as prior art shown in FIG. 11, and it is possible to make the motorcycle compact.

In the motorcycle, preferably, the catalyst pipe may be arranged under the engine, and a front end of the catalyst pipe may be connected to the exhaust pipe in an exhaust gas upstream side by the flange joint.

In accordance with the structure mentioned above, it is possible to compactly arrange the catalyst apparatus or the like under the engine.

In the motorcycle, preferably, the engine may have a plurality of exhaust ports, the exhaust paths from the exhaust ports to the front end of the catalyst pipe may be composed of a plurality of individual exhaust pipes connected to the exhaust ports respectively, and a collecting pipe collecting the individual exhaust pipes and contracted toward an exhaust gas downstream side, the catalyst pipe may have a front end portion contracted toward the exhaust gas upstream side, and a flange provided in the contracted rear end of the collecting pipe and a flange provided in the contracted front end of the catalyst pipe may be fastened by a fastening means to from the flange joint.

In accordance with the structure, in spite that the catalyst pipe arranged under the engine, the motorcycle can have enough minimum road clearance and enough bank angle.

In the motorcycle, preferably, the catalyst pipe may be made of stainless steel, and the exhaust pipe connected to the catalyst pipe may be made of titanium or titanium alloy.

BRIEF DESCRIPTION OF THE DRAWINGS

The above and other objects, features and advantages of the present invention will be become more apparent from the following description taken in connection with the accompanying drawings.

DETAILED DESCRIPTION OF THE PREFERRED EMBODIMENTS

FIGS. 1 to 10 show an example in which an exhaust apparatus in accordance with the present invention is provided in a motorcycle and a description will be given below of an embodiment of the present invention on the basis of these drawings.

Figure 1:
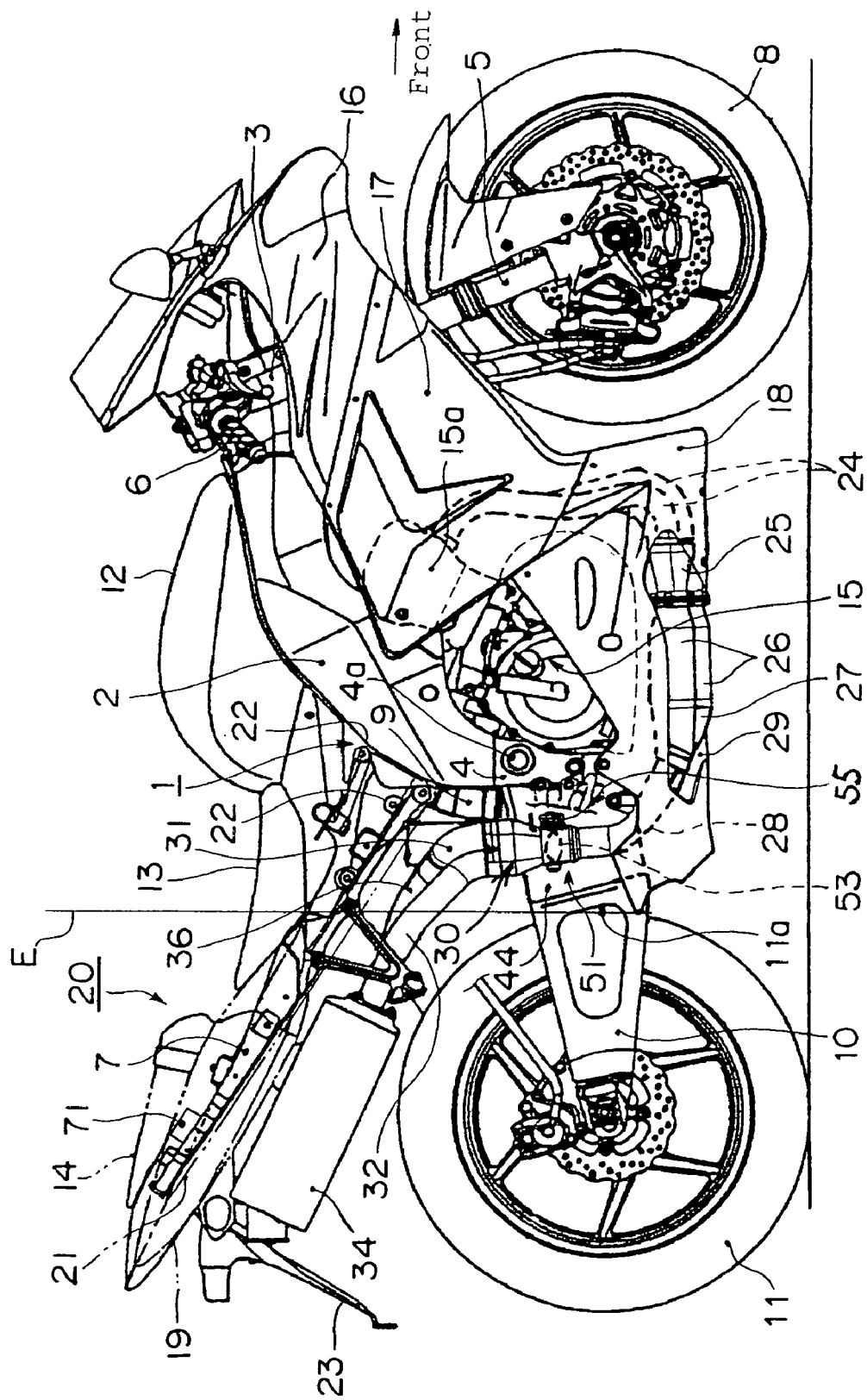
FIG. 1 is a right side elevational view of a motorcycle provided with an exhaust apparatus in accordance with an embodiment of the present invention.

FIG. 1 is a right side elevational view of the motorcycle. In FIG. 1, a vehicle body frame 1 is composed of a pair of right and left main frames 2, a pair of right and left swing arm brackets 4, and a rear frame 7, and has an approximately Y shape as seen from the side. The main frame 2 extends backward and downward from a head pipe 3 provided at a front end portion of the which body frame, and rear end portions of the right and left main frames 2 are coupled to each other by a cross member (not shown). The swing arm brackets 4 are fixed to the rear and lower end portions of the main frames 2 by welding, and protrude downward. The rear frame 7 is fixed to a rear end portion of the main frame 2 by bolts 22, extends backward upward from the rear end portion of the main frame 2, and covers a rear wheel 11 from upper side. The rear frame 7 functions as a seat rail for supporting a rider seat 13 and passenger seat 14. A front fork 5 is supported to the head pipe 3, a handle 6 is provided in an upper end portion of the front fork 5, and a front wheel 8 is supported to a lower end portion of the front fork 5.

A front end portion of a swing arm 10 is rotatably supported to a pivot portion 4a of the swing arm bracket 4, whereby the swing arm 10 swings upward and downward around the pivot portion 4a. The rear wheel 11 is supported to a rear end portion of the swing arm 10, and a rear shock absorber 9 having an approximately standing posture is interposed between the front portion of the swing arm 10 and the rear end portion of the main frame 2 so as to freely expand and contract. An upper side of the vehicle body frame 1 is provided with a fuel tank 12, the rider seat 13 and a passenger seat 14 seriatim in this order from the front side. An engine 15 having four cylinders in line in a direction of the vehicle body wide is mounted to a lower side of the main frame 2.

A front portion of the vehicle body is provided with a front cowl 16 covering a front side of a handle 6, a side cowl 17 covering right and left sides of an upper portion of the engine 15, and a lower cowl 18 covering right and left sides and a lower side of a lower portion of the engine 15. A rear portion of the vehicle body is provided with a rear cowl (shown by a phantom line) 19 covering a rear half portion of the rear frame 7. A rear fender 21 is provided within the rear frame 7. An opening 29 is formed at a position corresponding to a catalyst pipe 26 arranged under the engine, in a bottom of the lower cowl 18.

Figure 2:
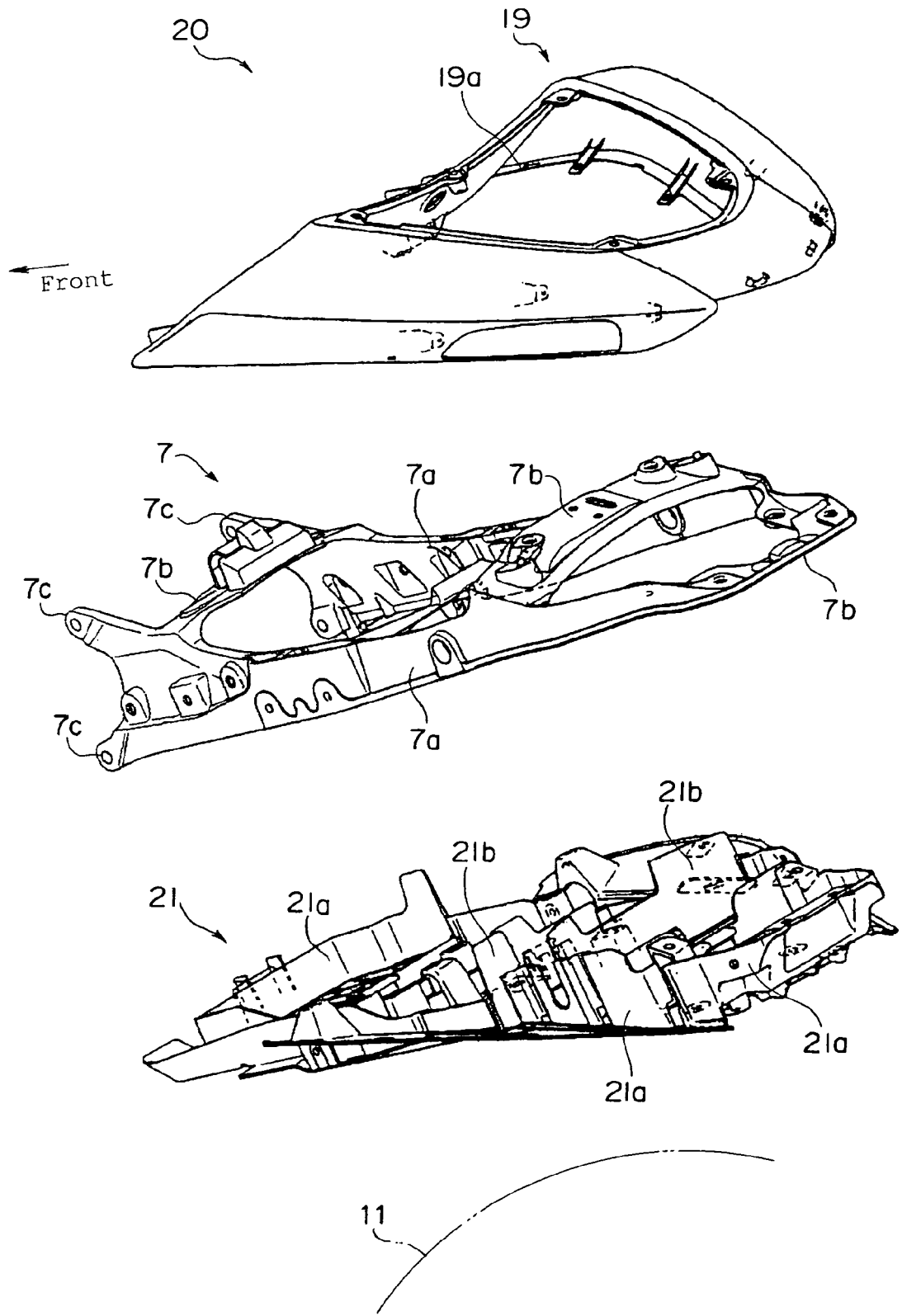
FIG. 2 is an exploded perspective view of a rear upper part of a vehicle body of the motorcycle in FIG. 1.

FIG. 2 is an exploded perspective view showing details of a rear upper portion 20 of the motorcycle arranged in the upper side of the rear wheel 11. The rear upper portion 20 is mainly composed of the rear frame 7, the rear cowl 19 and the rear fender 21. The rear frame 7 is composed of a pair of right and left rail portions 7a extending in a backward and forward direction, and a plurality of cross portions 7b coupling the right and left rail portions 7a. The right and left portions 7a and the cross portions 7b of the rear frame 7 are formed integrally in a rectangular shape in a top view by casting or a die casting. A pair of upper and lower mounting boss portions 7c are formed in a front end portion of each of the right and left rail portions 7a. The rear fender 21 is made of a synthetic resin and covers an upper side of the rear wheel 11. A side wall 21a is integrally formed around the rear fender 21 in such a manner that various parts for the vehicle can be mounted and accommodated on an upper surface of the rear fender 21. Further, a plurality of partition walls 21b are formed in the upper surface of the rear fender 21 in such a manner that the various mounted parts can be sorted to predetermined positions. The rear fender 21 is fitted into the rear frame 7 from below, and is fastened to the rear frame 7 by a plurality of bolts (not shown). The rear cowl 19 covers a rear half portion of the rear frame 7, and an opening 19a for mounting the rear seat is formed in the rear cowl 19.

Further as shown in Fug, 1, the rear upper portion 20 includes the rider seat 13, the passenger seat 14, a mud guard 23 and the like.

Figure 3:
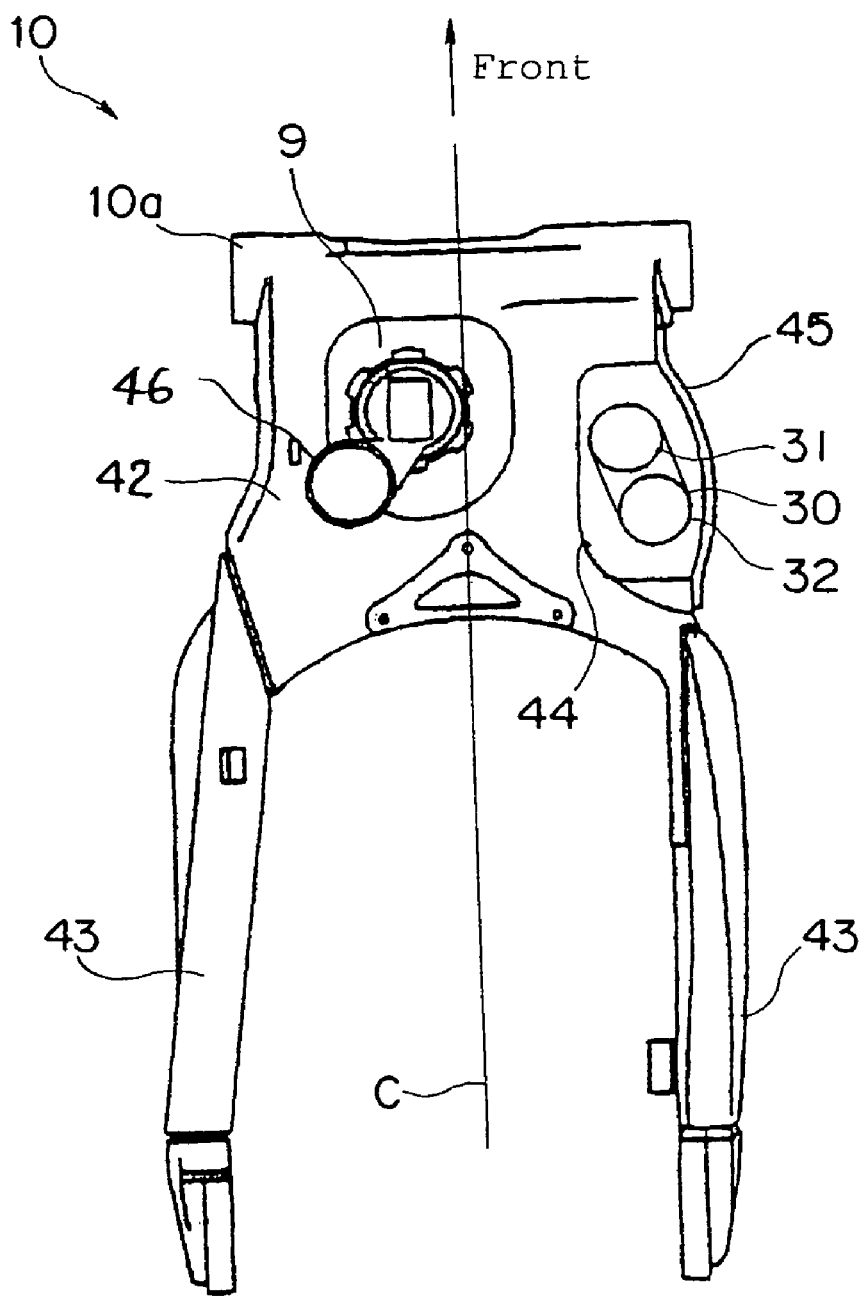
FIG. 3 is a plan view of a swing arm of the motorcycle in FIG. 1.

FIG. 3 is a plan view of the swing arm 10. The swing arm 10 is composed of a plane front portion 42 integrally formed with a pivot tube portion 10a in a front end, and a pair of right and left arm portions 43 extending backward from the plane front portion 42. A concave portion 44 for inserting branch exhaust pipes 31 and 32, which will be described later, is formed in a right end portion of the plane front portion 42, and an exhaust pipe cover 45 is detachably mounted to a right opening end of the concave portion 44. In FIG. 1, the exhaust pipe cover 45 is omitted. The rear shock absorber 9 is positioned in a left side from a vehicle width center line C, that is, in an opposite side to the concave portion 44, and an oil reserve tank 46 provided in an upper end portion of the shock absorber 9 is positioned in a further left side than the rear shock absorber 9.

(Structure of Exhaust Apparatus)

Figure 4:
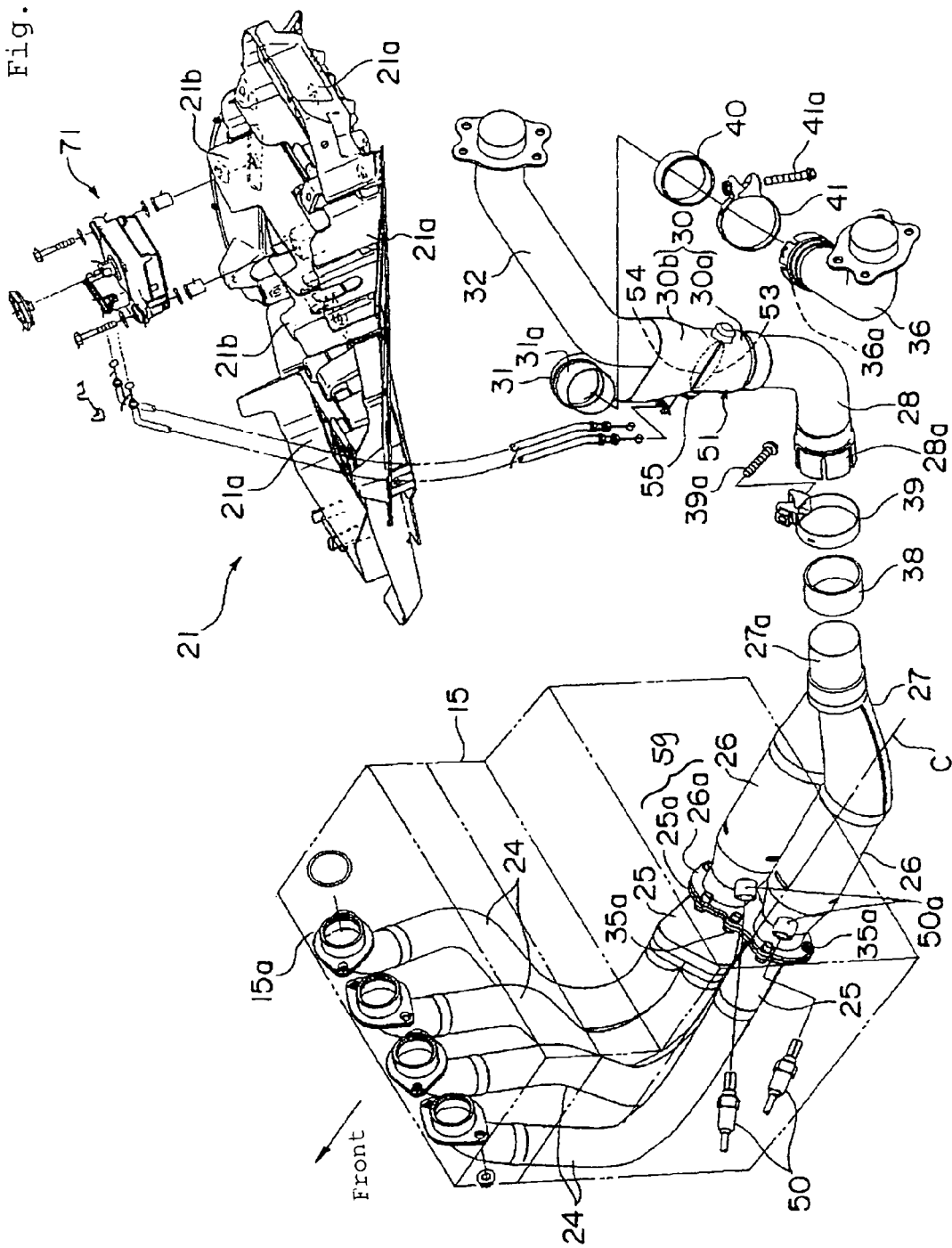
FIG. 4 is an exploded perspective view of the exhaust apparatus of the motorcycle in FIG. 1.
Figure 5:
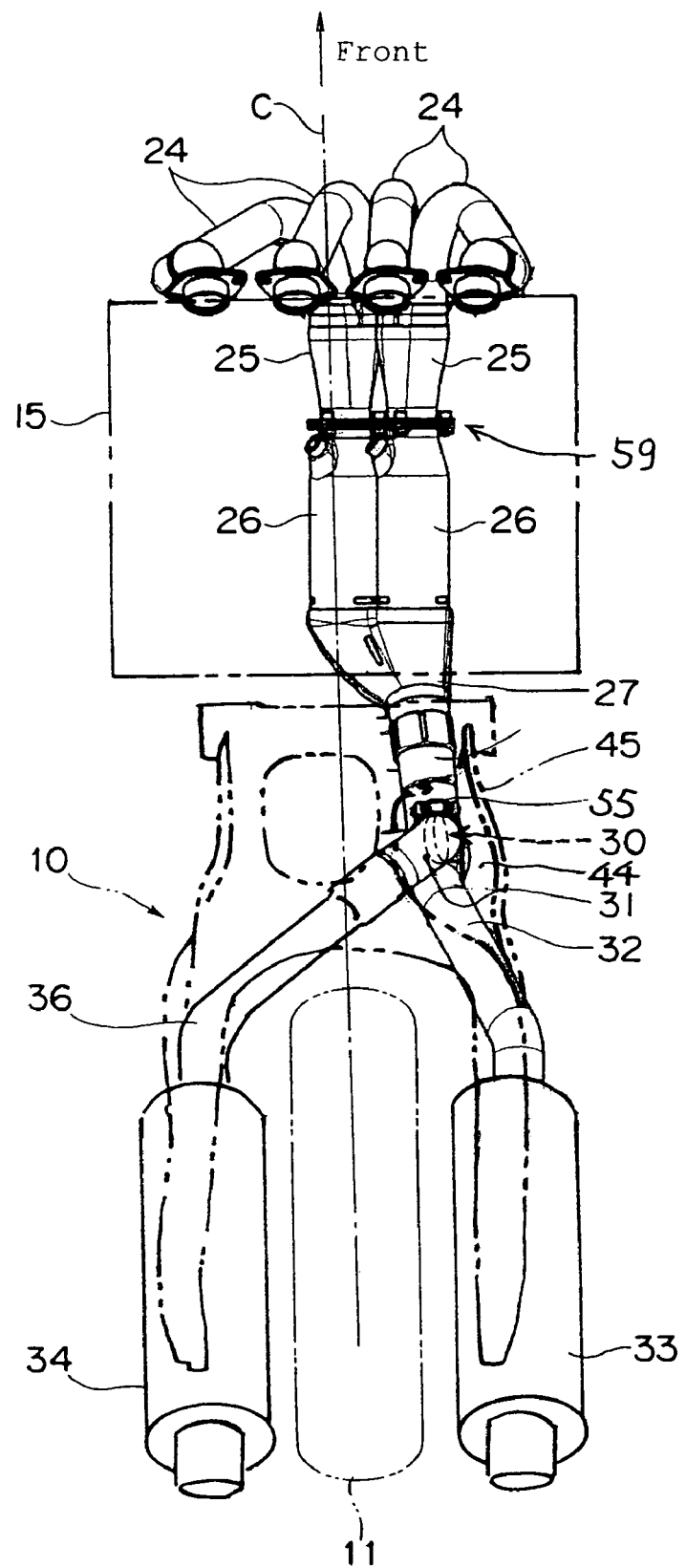
FIG. 5 is a plan view of the exhaust apparatus of the motorcycle in FIG. 1.
Figure 6:
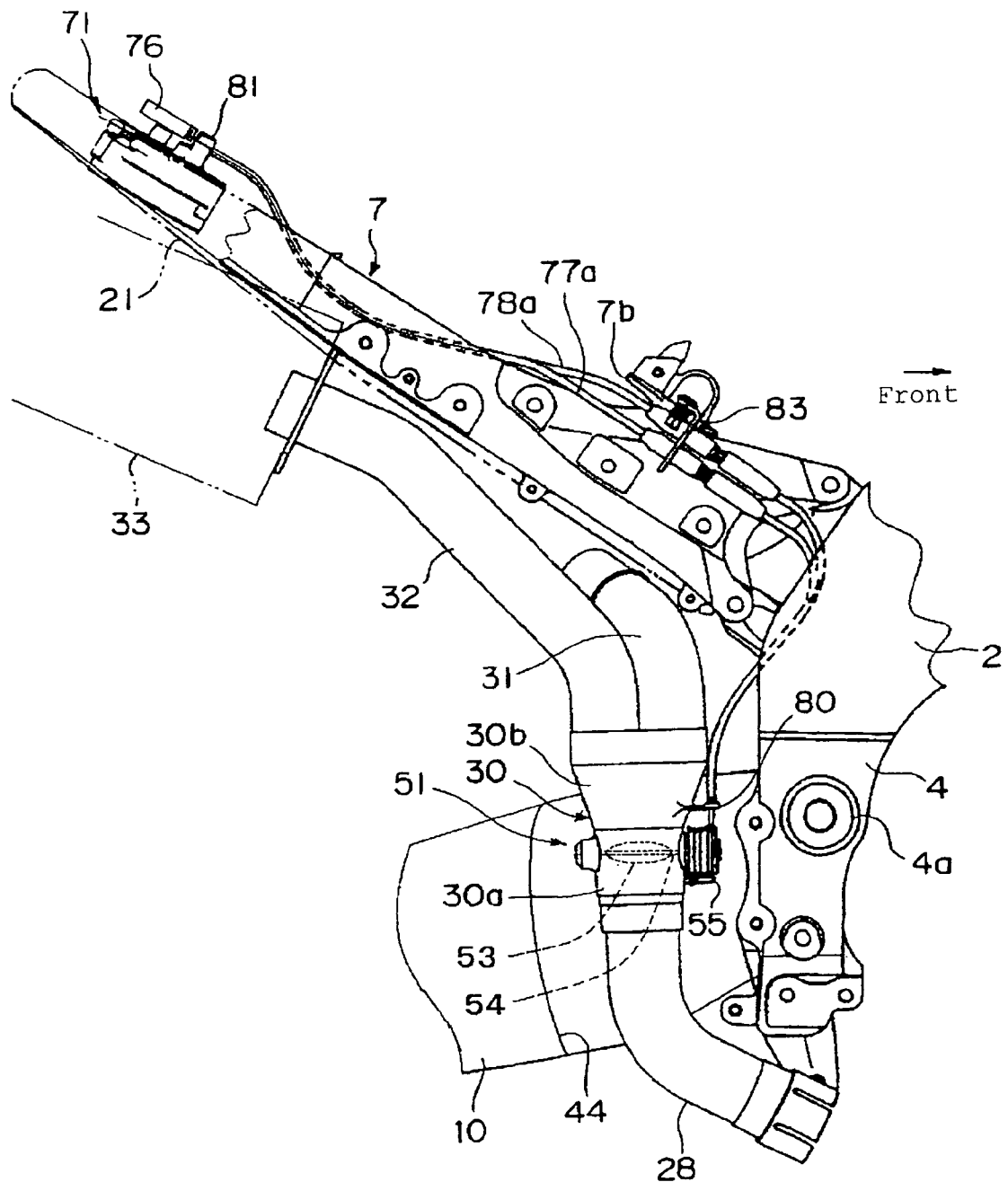
FIG. 6 is a right side elevational view of an engine rear portion of the exhaust apparatus in FIG. 1.
Figure 7:
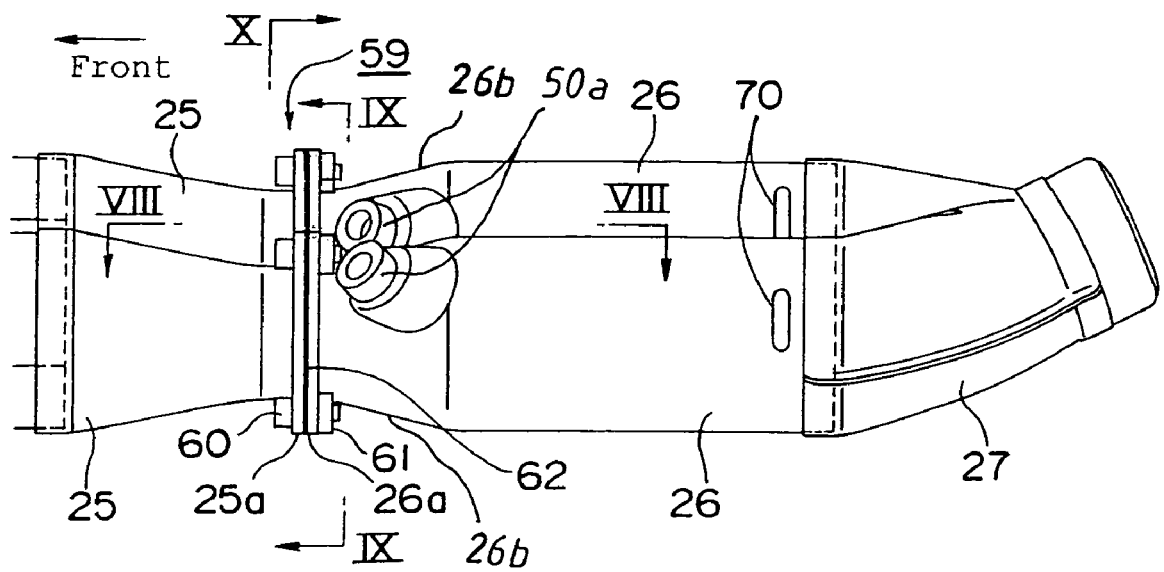
FIG. 7 is an enlarged view of a left side surface of a catalyst pipe in FIG. 1.
Figure 8:
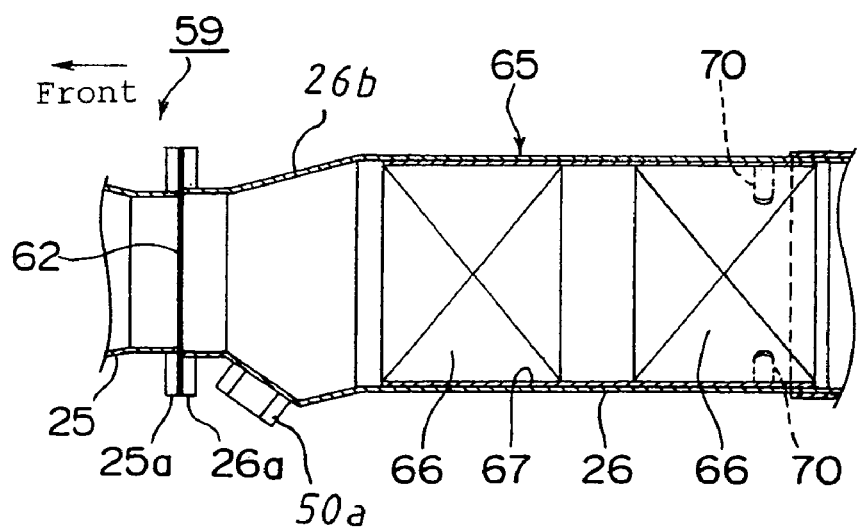
FIG. 8 is a cross sectional view along a line VIII-VIII in FIG. 7.
Figure 9:
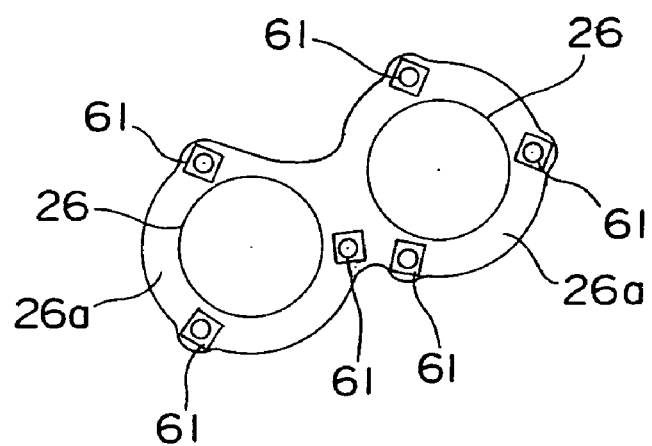
FIG. 9 is a cross sectional view along a line IX-IX in FIG. 7.
Figure 10:
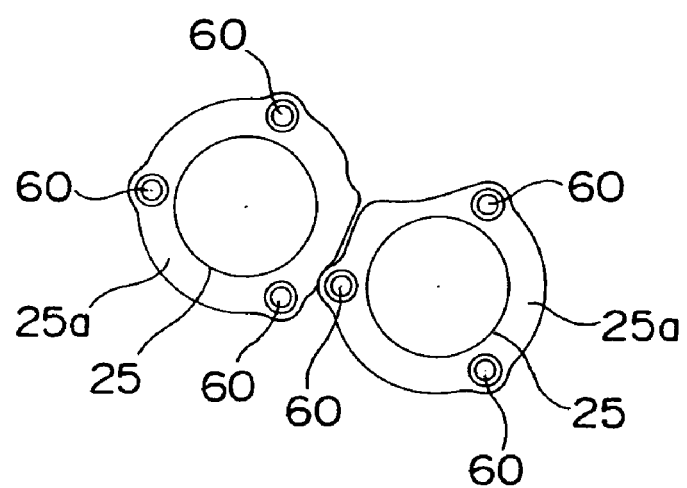
FIG. 10 is a cross sectional view along a line X-X in FIG. 7.
Figure 11:
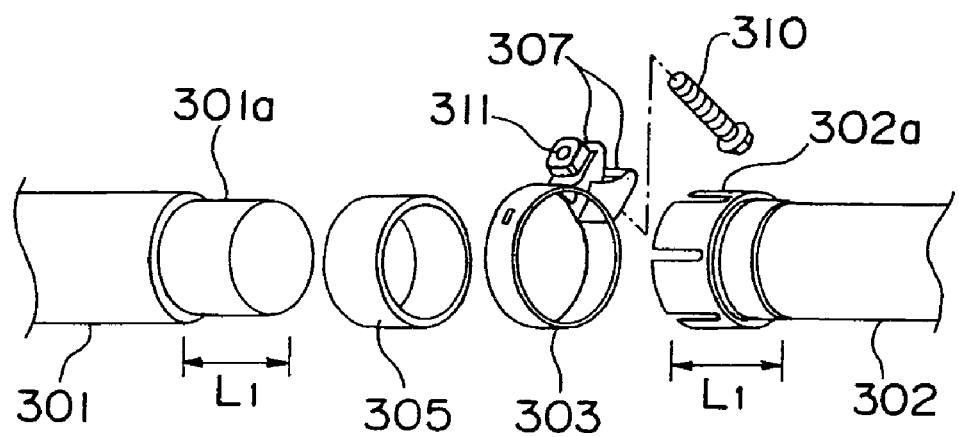
FIG. 11 is an exploded perspective view of a conventional fitting joint using a clamp.
Figure 12:
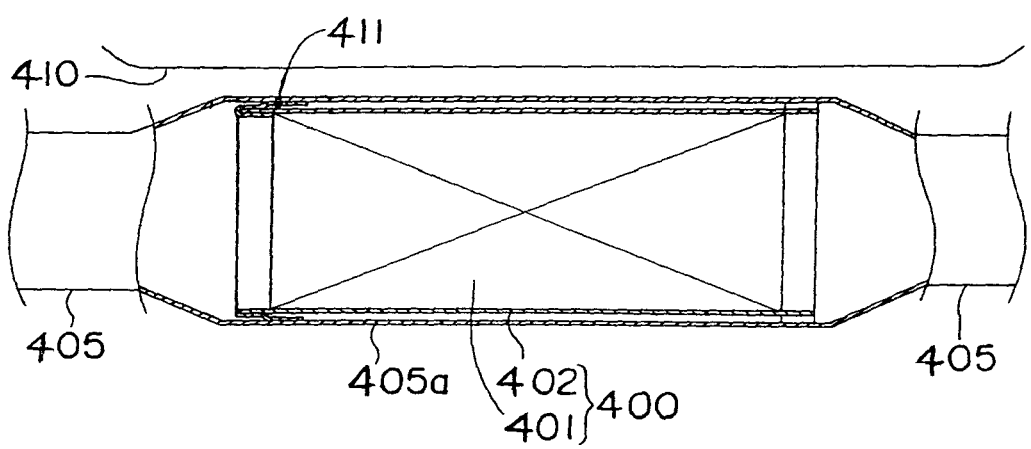
FIG. 12 is a side elevational view, partially cut away, showing a catalyst apparatus of a conventional exhaust apparatus for a motorcycle.

FIG. 4 is an exploded perspective view of an exhaust apparatus of the motorcycle. FIG. 5 is a plan view of the exhaust apparatus. FIG. 6 is a right side elevational view of an engine rear position of the exhaust apparatus. FIG. 7 is an enlarged left side view of the catalyst pipe 26. FIG. 8 to 10 are cross sectional enlarged views along lines VIII-VIII, IX-IX, and X-X of the catalyst pipe 26 in FIG. 7.

In FIG. 4, four individual exhaust pipes 24 made of titanium or titanium alloy are respectively connected to exhaust ports of four cylinders open at a front face of a cylinder head 15a of the engine 15. Four individual exhaust pipes 24 extend downward in front of the engine 15, are curved backward at a position near a front lower end of the engine 15, and extend backward under the engine 15.

A pair of right and left first collecting pipes 25 made of titanium or titanium alloy are arranged under the engine 15. Lower end portions of the four individual exhaust pipes 24 are connected to front end portions of the first collecting pipes 25 respectively two by two by welding. A pair of right and left catalyst pipes 26 made of stainless steel and having a catalyst apparatus built-in are arranged behind the first collecting pipes 25. Front end portions of the catalyst pipes 26 are detachably connected to rear end portions of the first collecting pipes 25 by a flange joint 59. The pair of catalyst pipes 26 are structured, for example, such that the left catalyst pipe 26 is arranged approximately on a vehicle width center line C, and the right catalyst pipe 26 is arranged at a position displaced to a right side from the vehicle width center line C. An oxygen sensor mounting boss 50a protruding outward in a radial direction of the catalyst pipe 26 is formed in a front portion of each of the catalyst pipes 26. An oxygen sensor 50 is mounted to each of the oxygen sensor mounting bosses 50a. Each of the oxygen sensor mounting bosses 50a protrudes so as to be directed to a left upper side.

A front end portion of a second collecting pipe 27 made of the same stainless steel as the material of the catalyst pipes 26 is connected to the rear end portions of two catalyst pipes 26 by welding to collect two exhaust path into one, and a front end portion of a single exhaust pipe (an upstanding exhaust pipe) 28 made of titanium alloy is detachably connected to a rear end portion of the second collecting pipe 27 by a fitting joint utilizing a clamp 39. A detail of a connecting structure by the fitting joint utilizing the clamp 39 is as follows. At first, the second collecting pipe 27 and the exhaust pipe 28 are connected by faucet fitting a rear end portion 27a of the second collecting pipe 27 into a front end portion 28a of the exhaust pipe 28 via an annular seal 38. Then the annular clamp 39 is fitted on an outer side of the fitting portion. At last, the clamp 39 is contracted by a bolt 39a.

The upstanding exhaust pipe 28 stands approximately vertically upward behind the engine 15, and a upper end of the upstanding exhaust pipe 28 is connected to a bottom end of a branch pipe 30 by welding. The branch exhaust pipe 30 has an exhaust device body portion 30a having a single exhaust path and a branch portion 30b, and is made of titanium or titanium alloy. The branch portion 30b branches the single exhaust path back and forth, and branch exhaust pipes 31 and 32 made of titanium or titanium alloy are respectively connected to the front and rear branch ports of the branch pipe 30 by welding.

In FIG. 6, the upstanding exhaust pipe 28 having a standing shape protrudes into the concave portion 44 of the swing arm 10 from the lower side, and the exhaust device body portion 30a and a part of the branch portion 30b are accommodated within the concave portion 44. The branch exhaust pipe 32 positioned to the rear side is provided for a right exhaust muffler 33, extends upward to the back, and is connected to a front end inlet of the right exhaust muffler 33.

In FIG. 5, the branch exhaust pipe 31 positioned to the front side is provided for a left exhaust muffler 34, and is interrupted at a right position from the vehicle width center line C, and an extension exhaust pipe 36 made of the same titanium or titanium alloy as the material of the branch exhaust pipe 31 is detachably connected to a leading end portion of the branch exhaust pipe 31. The extension exhaust pipe 36 comes across in front of the rear wheel 11 to a left side, and is connected to a front end inlet of the left exhaust muffler 34. In the embodiment mentioned above, as shown in FIG. 4, a connection portion between the branch exhaust pipe 31 for the left exhaust muffler 34 and the extension exhaust pipe 36 forms a fitting joint using a clamp 41. Namely, the rear end portion 31a of the branch exhaust pipe 31 is inserted into a front end portion 36a of the extension exhaust pipe 36 via an annular seal 40, an annular clamp 41 is fitted on an outer side surface of the fitting portion, and the clamp 41 is contracted by a bolt 41a.

In FIG. 5, the left and right exhaust mufflers 34 and 33 are positioned at left and right sides of the rear wheel 11 in a plan view, and as shown in FIG. 1, are positioned between the rear cowl 19 and the rear wheel 11 in a vertical direction.

(Summary of Material of Exhaust Path Forming Member)

In FIG. 5, the exhaust path from the exhaust port of the engine 15 to the inlets of the exhaust mufflers 33 and 34 is composed of a plurality of exhaust path forming members connected each other. In the embodiment, the cylinder exhaust pipe 24, the first collecting pipe 25, the catalyst pipe 26, the second collecting pipe 27, the upstanding exhaust pipe 28, the branch pipe 30, the branch exhaust pipes 31 and 32, and the extension exhaust pipe 36 are connected seriatim in this order from the exhaust upstream side. With regard to the material, the catalyst pipe 26 and the second collecting pipe 27 integrally formed with the catalyst pipe 26 are made of the same stainless steel as the material of a catalyst apparatus 65 (FIG. 8), and the cylinder exhaust pipes 24, the first collecting pipe 25, the upstanding exhaust pipe 28, the branch pipe 30, the branch exhaust pipe 31 and 32, and the extension exhaust pipe 36 are made of the titanium or the titanium alloy having a smaller specific gravity than the stainless steel, as mentioned above.

(Catalyst Apparatus)

FIG. 7 is an enlarged left side view of the catalyst pipes 26. FIG. 8 is a cross sectional view along a tine VIII-VIII in FIG. 7. In FIG. 8, the catalyst apparatus 65 is accommodated within the catalyst pipe 26 made of the stainless steel, and is composed of a case 67 having a thin cylindrical shape and made of stainless steel, and a pair of front and rear catalyst carriers 66. The catalyst carriers 66 are constituted by spirally winding a metal honeycomb made of stainless steel. Both the catalyst carriers 66 carry a catalyst such as a platinum, a vanadium or the like, are fitted into the case 67 at a predetermined interval in an exhaust gas flow direction, and are fixed to an inner peripheral surface of the case 67, for example, by spot welding. The case 67 is structured such that one end portion in the exhaust gas flow direction, for example, an end portion in a downstream side of the exhaust gas flow direction is fixed to an inner peripheral surface of the catalyst pipe 26 by welding, and an end portion in an upstream side is formed as a free end portion which is movable in the exhaust gas flow direction. The welding structure of the case. 67 to the catalyst pipe 26 is made, for example, such as to form a long hole 70 at three positions at a uniform interval in a peripheral direction of the catalyst pipe 26, and fix the case 67 to the catalyst pipe 26 in portions of the long holes 70 by welding (a plug welding). In this case, the catalyst apparatus 65 is not limited to the honeycomb type catalyst as mentioned above, but can have, for example, a catalyst or like utilizing a punching plate built-in. However, the same stainless steel as the material of the catalyst pipe 26 is used as the material of the catalyst carrier, and is fixed to the catalyst pipe 26 by welding.

(Joint Structure of Catalyst Pipe)

In FIG. 4, as mentioned above, the second collecting pipe 27 formed in the rear end of the catalyst pipe 26 made of the stainless steel is connected to the upstanding exhaust pipe 28 made of the titanium or the titanium alloy by the fitting joint utilizing the clamp 39. However, the front end of the catalyst pipe 26 is connected to the rear end of the first collecting pipe 25 by the flange joint 59 as mentioned above. A description will be in detail given below of a structure of the flange joint 59.

In FIG. 7, a front end portion 26b of the catalyst pipe 26 is formed in a taper shape contracted toward a front side, and an outward flange 26a made of the same stainless steel as the material of the catalyst pipe 26 is fixed to a front end in a small diameter side of the taper-shaped front end portion 26b by welding. On the other hand, the first collecting pipe 25 is formed in a taper shape contracted toward a rear side, and an outward flange 25a made of the same titanium or titanium alloy as the material of the first collecting pipe 25 is fixed to a rear end in a small diameter side of the taper-shaped first collecting pipe 25 by welding. Further, each of the oxygen sensor mounting bosses 50a is provided in the taper-shaped front end portion 26b of the catalyst pipe 26. A pair of outward flanges 26a for the right and left catalyst pipes 26 are structured, as shown in FIG. 9, such that both the flanges 26a are formed as an integral member, and a nut 61 is fixed to a bolt insertion hole formed in each of the outward flanges 26a by welding. On the other hands, as shown in FIG. 10, the pair of outward flanges 25a for the first collecting pipe are formed in a state in which they are separated and independent from each other.

In FIG. 7, both the outward flanges 25a and 26a are overlapped via a metal gasket 62, and the catalyst pipe 26 and the first collecting pipe 25 are connected by screwing the bolts 60 with the nuts 61. The bolts 60 are inserted to the bolt insertion holes of both the flanges 25a and 26a from the front side. In this case, since the flange 26a of the catalyst pipe 26 is provided in the front end in the small diameter side of the taper-shaped front end portion 26b, and the flange 25a of the first collecting pipe 25 is provided in the rear end in the small diameter side of the taper-shaped first collecting pipe 25, it is possible to limit an outer diameter of each of the flanges 26a and 25a to a magnitude approximately the same level as an outer diameter of the catalyst pipe 26 and an outer diameter of the first collecting pipe 25. In other words, the structure is made such that each of the flanges 26a and 25a hardly protrudes to an outer side in a radial direction from the catalyst pipe 26 and the first collecting pipe 25. Further, since each of the oxygen sensor mounting boss portions 50a is formed in the taper-shaped front end portion 26b of the catalyst pipe 26, the oxygen sensor mounting boss 50a does not largely protrude to an outer side in a radial direction from the flange 26a of the catalyst pipe 26, and each of the oxygen sensor mounting boss 50a protrudes diagonally to the left upper side, and does not protrude downward. Accordingly, it is possible to make the minimum road clearance higher.

(Exhaust Device and Actuator for Exhaust Device)

In FIG. 4, the exhaust device body portion 30a of the branch pipe 30 is provided, for example, with a butterfly valve as the exhaust device 51, and is composed of a valve shaft 54 rotatably supported within the exhaust device body portion 30a, a circular disc-shaped valve body 53 fixed to the valve shaft 54, a driven pulley 55 arranged in the front side of the exhaust device body portion 30a and the like. The valve shaft 54 is arranged horizontally so as to extend in a backward and forward direction, and protrudes forward. The driven pulley 55 is fixed to the front protruding portion of the valve shaft 54. The driven pulley 55 is coupled in an interlocking manner to a drive pulley 76 of an actuator 71 arranged in the rear portion of the rear fender 21 via a pair of driving cables 77 and 78.

The actuator 71 has a step motor and a speed reduction mechanism of the electric motor built-in, is mounted to an upper surface in the rear portion of the rear fender 21 from the above. The actuator 71 is electrically connected to an electronic control unit (not shown) and is rotated at a predetermined rotating amount in a predetermined direction (in a valve opening direction and a valve closing direction) on the basis of a control signal from the electronic control unit.

(Assembly of Catalyst Pipe and Exhaust Pipe)

In FIG. 4, the front end portion of the catalyst pipe 26 is connected to the rear end portion of the first collecting pipe 25 by the flange joint 59 as mentioned above. In other words, in FIG. 7, both the flange portions 25a and 26a are overlapped via the metal gasket 62, and are connected by the bolt 60 and the nut 61. Since the flange joint 59 is utilized, it is not necessary to secure the large working space in the catalyst pipe length direction such as the fitting joint using the clamp.

On the other hand, in FIG. 4, the exhaust pipe 28 is connected to the rear end portion 27a of the second collecting pipe 27 by the fitting joint utilizing the clamp 39. The upstanding exhaust pipe 28 is connected to the branch pipe 30 by welding. The second collecting pipe 27 is connected to the rear end portion of the catalyst pipe 26 by welding. The upper end portion of the upstanding exhaust pipe 28 and the branch pipe 30 are accommodated within the concave portion 44 of the swing arm 10 after the end of the assembly, as shown in FIG. 5. However, when connecting the upstanding exhaust pipe 28 to the second collecting pipe 27, the upstanding exhaust pipe 28 is set to a state in which upstanding the exhaust pipe 28 is inclined so as to protrude to a right side from the concave portion 44 of the swing arm 10, is temporarily fitted to the rear end portion 27a of the second collecting pipe 27, and is thereafter returned into the concave portion 44, and the left extension exhaust pipe 36 is fitted and connected to the branch exhaust pipe 31 by utilizing the clamp. In other words, the branch pipe 30 and the exhaust pipe 28 is rotated in a state in which the left exhaust pipe 36 is not connected, it is possible to rotate without coming into collision with, for example, the fender 21, and it does not take a lot of trouble with the assembling work.

(Operation and Effect of Embodiment)

(1) Since the catalyst pipe 26 arranged under the engine 15 and made of the stainless steel and the first collecting pipe 25 made of the titanium or the titanium alloy are connected by the flange joint 59, it is possible to make the dimension in the pipe length direction (the longitudinal direction) and the pipe radial direction smaller in comparison with the fitting connection structure of the different material using the clamp, whereby it is possible to compactly arrange the catalyst pipe 26 in the limited layout space under the engine 15 keeping the minimum road clearance and the bank angle enough in the motorcycle. Further, the space for the connecting work (the assembling work) can be made smaller, and it is possible to easily execute the assembling work. Particularly, as shown in FIG. 7, if the flanges 26a and 25a are respectively formed in the end edges in the small diameter side of the taper portions of the pipes 26 and 25 to be connected, it is possible to make the outer diameters of the flanges 26a and 25a smaller.

(2) Since the catalyst pipe 26 accommodating the catalyst apparatus 65 made of the stainless steel is made of the same stainless material as the material of the catalyst apparatus 65, and the catalyst apparatus 65 is fixed to the catalyst pipe 26 by welding, it is possible to mount the catalyst apparatus 65 without using any particular mounting part such as the bracket or the like, it is possible to make the mounting structure of the catalyst apparatus 65 to the catalyst pipe. 26 simple, and it is possible to secure the exhaust gas distributing cross sectional area of the catalyst apparatus 65 large without enlarging the diameter of the catalyst pipe more than necessary.

(3) Since the catalyst pipe 26 to which the catalyst apparatus 65 is fixed by welding is made of the same stainless steel, and the other exhaust pipes 24, 28, 31 and 32 and the first collecting pipe 25 are made of the titanium or the titanium alloy, in a plurality of exhaust path forming members, it is possible to reduce weight of the entire of the exhaust apparatus while improving the assembling property of the catalyst apparatus 65 as mentioned above.

(4) Since the concave portion 44 is formed in the swing arm 10, and the branch pipe 30 of the exhaust apparatus is configured to pass through the concave portion 44, as shown in FIG. 5, it is possible to compactly maintain the dimension in the vehicle width direction of the vehicle.

Other Embodiments of Present Invention (1) In the embodiment, the connecting portion between the front end portion of the catalyst pipe 26 and the rear end portion of the first collecting pipe 25 is formed as the flange joint 59. However, the flange joint can be used as a connecting portion between the rear end portion of the second collecting pipe 27 integrally welded to the rear end of the catalyst pipe 26 and the front end portion of the upstanding exhaust pipe 28. It is understood that the connecting portion using the flange joint is not limited to the connecting portion mentioned above, but the flange joint can be used, for example, in the connecting portion between the exhaust pipes as far as it corresponds to the connecting portion between the end portions of the exhaust path forming members made of the different materials. In the case that a plurality of connecting portions between the end portions of the exhaust path forming members exist, it goes without saying that the flange joint can be used for the connecting portion between the exhaust path forming members made of the same kind of material in the light of an assembling property, in addition to the flange joint used in the connecting portion between the end portions of the exhaust path forming members made of the different materials as mentioned above.

(2) In the embodiment mentioned above, the catalyst pipe 26 is made of the stainless steel, and the upstanding exhaust pipe 28 and the like are made of the titanium or the titanium alloy, as the combination of the exhaust path forming members made of the different materials. However, it is possible to employ the other combinations of the different materials. For example, the exhaust pipe 28 and the like are made of Inconel of Ni, Cr and Fe alloys or the other light alloys with respect to the catalyst pipe made of the stainless steel. Further, it may be possible to employ an inexpensive material, for example, steel or the like, with respect to the catalyst pipe.

(3) In the embodiment, the flange joint can be used as a connecting portion between the rear end portion of the second collecting pipe 27 integrally welded to the rear end of the catalyst pipe 26 and the front end portion of the upstanding exhaust pipe 28. Further, the connecting portion between the front end portion of the catalyst pipe 26 and the first collecting pipe 25 can be constituted by a fitting connection using the clamp. In short, the structure of the connecting portion of the exhaust path forming members is not limited to the structure in accordance with the embodiment mentioned above, but can appropriately select the fitting joint using the clamp and the flange joint.

Further, the exhaust apparatus in accordance with the present invention can be applied to an exhaust apparatus for a saddle riding type 4-wheel traveling vehicle or other vehicle, in addition to the exhaust apparatus for the motorcycle.

Although the present invention has been fully described in connection with the preferred embodiment thereof with reference to the accompanying drawings, it is to be noted that various other changes and modifications are also apparent to those skilled in the art. Such changes and modifications are to be understood as included within the scope of the present invention as defined by the appended claims unless they depart there from.

What is claimed is:

1. An exhaust apparatus for a vehicle, said exhaust apparatus comprising:
    a first exhaust pipe;
    a second exhaust pipe disposed beside said first exhaust pipe;
    a first catalyst pipe;
    a second catalyst pipe disposed beside said first catalyst pipe;
    a first flange disposed on said first exhaust pipe;
    a second flange disposed on said second exhaust pipe;
    a third flange disposed on said first catalyst pipe; and
    a fourth flange disposed on said second catalyst pipe;
    wherein said first flange of said first exhaust pipe is formed separately from said second flange of said second exhaust pipe, and said third flange of said first catalyst pipe is integrally formed with said fourth flange of said second catalyst pipe,
    wherein said first exhaust pipe and said second exhaust pipe are made of a first material, and said first catalyst pipe and said second catalyst pipe are made of a second material different than said first material, and
    wherein said first flange, said second flange, said third flange, and said fourth flange collectively form an outward flange joint, said outward flange joint being positioned at a small diameter end of each of said first exhaust pipe, said second exhaust pipe, said first catalyst pipe, and said second catalyst pipe,
    wherein each of said first exhaust pipe and said second exhaust pipe constitute a collecting pipe for collecting individual exhaust pipes, said collecting pipes being disposed upstream of each of said first catalyst pipe and said second catalyst pipe,
    wherein each of said first catalyst pipe and said second catalyst pipe accommodates a catalyst apparatus, is disposed downstream of said outward flange joint, and narrows in a direction toward said outward flange joint,
    wherein a first end portion of each of said first exhaust pipe and said second exhaust pipe is disposed upstream of said outward flange joint and narrows in a direction toward said outward flange joint,
    wherein said first catalyst pipe, said second catalyst pipe, said collecting pipes, and said outward flange joint are disposed under an engine of the vehicle.

2. The exhaust apparatus of claim 1, wherein said outward flange joint has an outer diameter disposed such that said outward flange joint does not extend beyond either of said first exhaust pipe or said first catalyst pipe in a radial direction.

3. The exhaust apparatus of claim 1, wherein a plurality of individual exhaust pipes are connected to each of said collecting pipes, said individual exhaust pipes being disposed upstream of said collecting pipes and downstream of the engine,
    wherein each of said collecting pipes has a first end and a second end, said first end being disposed at said individual exhaust pipes, and said second end being disposed at said outward flange joint, and
    wherein each of said collecting pipes narrows from said first end toward said second end.

4. The exhaust apparatus of claim 1, wherein each of said collecting pipes is configured to connect to a plurality of individual exhaust pipes, the individual exhaust pipes being disposed upstream of said collecting pipes and downstream of the engine, and
    wherein each of said collecting pipes has a first end and a second end, said first end being disposed at said individual exhaust pipes, and said second end being disposed at said outward flange joint, and
    wherein each of said collecting pipes narrows from said first end toward said second end.

5. An exhaust apparatus for a vehicle, said exhaust apparatus comprising:
- an exhaust path unit for forming an exhaust path between an exhaust port of an engine and an inlet of a muffler, said exhaust path unit including
  - a first exhaust path forming member having a first end portion,
  - a second exhaust path forming member having a second end portion, and
  - an outward flange joint connecting said first end portion of said first exhaust path forming member to said second end portion of said second exhaust path forming member;
- wherein said first end portion is made of a first material, and said second end portion is made of a second material different than said first material,
- wherein said first exhaust path forming member is a collecting pipe for collecting individual exhaust pipes, said collecting pipe being disposed upstream of said second exhaust path forming member,
- wherein said second exhaust path forming member is a catalyst pipe, said catalyst pipe accommodating a catalyst apparatus,
- wherein said first end portion of said collecting pipe is disposed upstream of said outward flange joint and narrows in a direction toward said outward flange joint,
- wherein said catalyst pipe is disposed downstream of said outward flange joint and narrows in a direction toward said outward flange joint,
- wherein said outward flange joint is positioned at a small diameter end of said first end portion and a small diameter end of said second end portion,
- wherein said catalyst pipe, said collecting pipe, and said outward flange joint are disposed under the engine,
- wherein said catalyst apparatus is welded to said catalyst pipe,
- wherein the first material has a smaller specific gravity than the second material,
- wherein a first flange is disposed on said collecting pipe,
- wherein a second flange is disposed on said catalyst pipe,
- wherein an additional collecting pipe is disposed alongside said collecting pipe, a third flange being disposed on said additional collecting pipe,
- wherein an additional catalyst pipe is disposed alongside said catalyst pipe, a fourth flange being disposed on said additional catalyst pipe, and
- wherein said second flange of said catalyst pipe is integrally formed with said fourth flange of said additional catalyst pipe, and said first flange of said collecting pipe is separately formed from said third flange of said additional collecting pipe.

6. The exhaust apparatus of claim 5, wherein
- said catalyst pipe and said catalyst apparatus are made of stainless steel,
- said collecting pipe is made of titanium or titanium alloy, and
- said exhaust path unit comprises an extension pipe made of titanium or titanium alloy.

7. The exhaust apparatus of claim 5, wherein said first flange of said collecting pipe and said third flange of said additional collecting pipe are made of titanium or titanium alloy; and
- said second flange of said catalyst pipe and said fourth flange of said additional catalyst pipe are made of stainless steel.

8. The exhaust apparatus of claim 5, wherein said outward flange joint is composed of said first flange, said second flange, said third flange, and said fourth flange.

9. The exhaust apparatus of claim 5, wherein a plurality of individual exhaust pipes are connected to said collecting pipe, said individual exhaust pipes being disposed upstream of said collecting pipe and downstream of the engine,
- wherein said collecting pipe has a first end and a second end, said first end being disposed at said individual exhaust pipes, and said second end being disposed at said outward flange joint, and
- wherein said collecting pipe narrows from said first end toward said second end.

10. The exhaust apparatus of claim 5, wherein said collecting pipe is configured to connect to a plurality of individual exhaust pipes, the individual exhaust pipes being disposed upstream of said collecting pipe and downstream of the engine, and
- wherein said collecting pipe has a first end and a second end, said first end being disposed at said individual exhaust pipes, and said second end being disposed at said outward flange joint, and
- wherein said collecting pipe narrows from said first end toward said second end.

11. The exhaust apparatus of claim 5, wherein each of said first flange and said second flange has an outer diameter that is approximately equal to an outer diameter of a non-narrowed portion of said first exhaust path forming member and an outer diameter of a non-narrowed portion of said second exhaust path forming member.

12. The exhaust apparatus of claim 11, wherein said outer diameter of said first flange and said second flange are disposed such that said outward flange joint does not extend beyond either of said collecting pipe or said catalyst pipe in a radial direction.

13. The exhaust apparatus of claim 5, wherein
- said collecting pipe includes a rear end portion tapering toward a rear side of said collecting pipe,
- said catalyst pipe includes a front portion tapering toward a front side of said catalyst pipe,
- said outward flange joint is disposed at said rear side of said collecting pipe and said front side of said catalyst pipe such that a smallest diameter portion of each of said front side of said catalyst pipe and said rear side of said collecting pipe are connected to said outward flange joint.

14. The exhaust apparatus of claim 13, further comprising:
- an oxygen sensor mounting boss disposed at said catalyst pipe.

* * * * *